(12) United States Patent
Noto et al.

(10) Patent No.: US 11,150,651 B2
(45) Date of Patent: Oct. 19, 2021

(54) INFORMATION PROCESSING APPARATUS

(71) Applicant: DENSO CORPORATION, Kariya (JP)

(72) Inventors: Noriyasu Noto, Kariya (JP); Hisaya Akatsuka, Kariya (JP); Yasuhiko Mukai, Kariya (JP); Daisuke Tokumochi, Kariya (JP)

(73) Assignee: DENSO CORPORATION, Kariya (JP)

( * ) Notice: Subject to any disclaimer, the term of this patent is extended or adjusted under 35 U.S.C. 154(b) by 28 days.

(21) Appl. No.: 16/097,015

(22) PCT Filed: Apr. 28, 2017

(86) PCT No.: PCT/JP2017/016999
§ 371 (c)(1),
(2) Date: Oct. 26, 2018

(87) PCT Pub. No.: WO2017/188443
PCT Pub. Date: Nov. 2, 2017

(65) Prior Publication Data
US 2019/0129417 A1 May 2, 2019

(30) Foreign Application Priority Data

Apr. 28, 2016 (JP) .............................. JP2016-091739

(51) Int. Cl.
| | |
|---|---|
| *B60W 50/14* | (2020.01) |
| *G05D 1/00* | (2006.01) |
| *G05D 1/02* | (2020.01) |
| *B60W 50/08* | (2020.01) |
| *B60W 40/08* | (2012.01) |

(52) U.S. Cl.
CPC ........... *G05D 1/0061* (2013.01); *B60W 40/08* (2013.01); *B60W 50/08* (2013.01); *B60W 50/14* (2013.01); *G05D 1/0088* (2013.01); *G05D 1/021* (2013.01); *G05D 2201/0213* (2013.01)

(58) Field of Classification Search
CPC ...... B60W 30/10; B60W 30/16; B60W 40/08; B60W 50/08; B60W 50/14; B60W 2050/146; G05D 1/0061; G05D 1/0088; G05D 1/021; G05D 2201/0213
See application file for complete search history.

(56) References Cited

U.S. PATENT DOCUMENTS

| | | | | |
|---|---|---|---|---|
| 9,690,292 | B1 * | 6/2017 | Chan | .............. B60W 50/08 |
| 2010/0036562 | A1 | 2/2010 | Becker | |
| 2012/0046817 | A1 * | 2/2012 | Kindo | ............... B60W 30/143 |
| | | | | 701/23 |

(Continued)

FOREIGN PATENT DOCUMENTS

| | | |
|---|---|---|
| JP | H09-86223 A | 3/1997 |
| JP | H10-309961 A | 11/1997 |
| JP | 2010-501394 A | 1/2010 |

*Primary Examiner* — Anshul Sood
(74) *Attorney, Agent, or Firm* — Maschoff Brennan

(57) ABSTRACT

An information processing apparatus installed in a vehicle includes a driving control section and a preparation control section. The driving control section executes automated driving of the vehicle. The preparation control section executes, when the automated driving is being executed by the driving control section, preparation control which is control that stops at least a part of the automated driving and makes the driver perform a preparation switching to driving by the driver of the vehicle.

11 Claims, 10 Drawing Sheets

(56) References Cited

U.S. PATENT DOCUMENTS

| | | | | |
|---|---|---|---|---|
| 2014/0156133 A1* | 6/2014 | Cullinane | ............ | B60W 30/00 |
| | | | | 701/23 |
| 2016/0041553 A1* | 2/2016 | Sato | ................... | B60W 30/143 |
| | | | | 701/23 |
| 2016/0231743 A1* | 8/2016 | Bendewald | ........... | B60W 30/12 |
| 2017/0248954 A1* | 8/2017 | Tomatsu | ............... | B60W 40/08 |
| 2017/0364070 A1* | 12/2017 | Oba | ..................... | B60W 50/08 |
| 2018/0113454 A1* | 4/2018 | Emura | ............... | G06K 9/00845 |

* cited by examiner

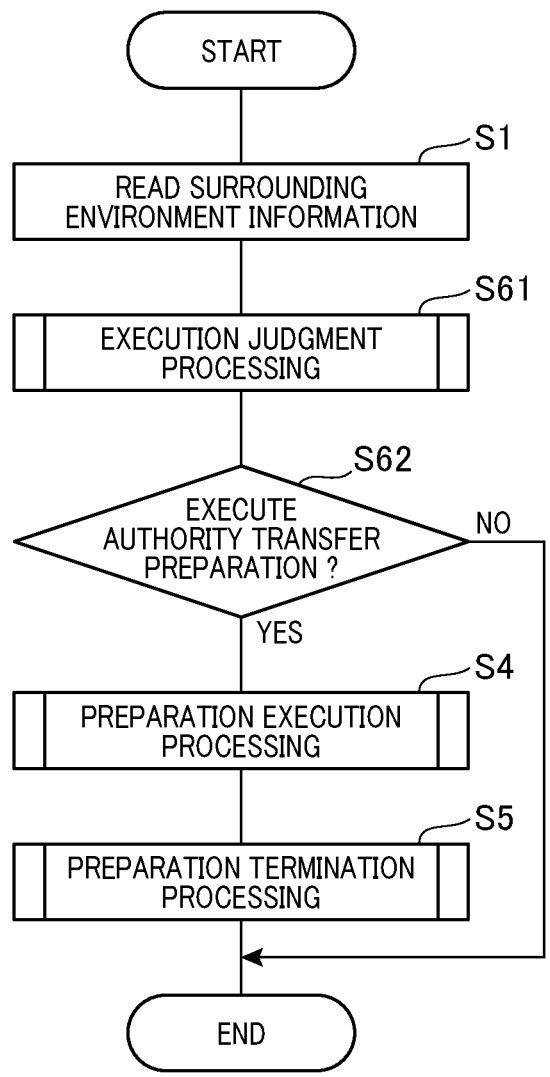

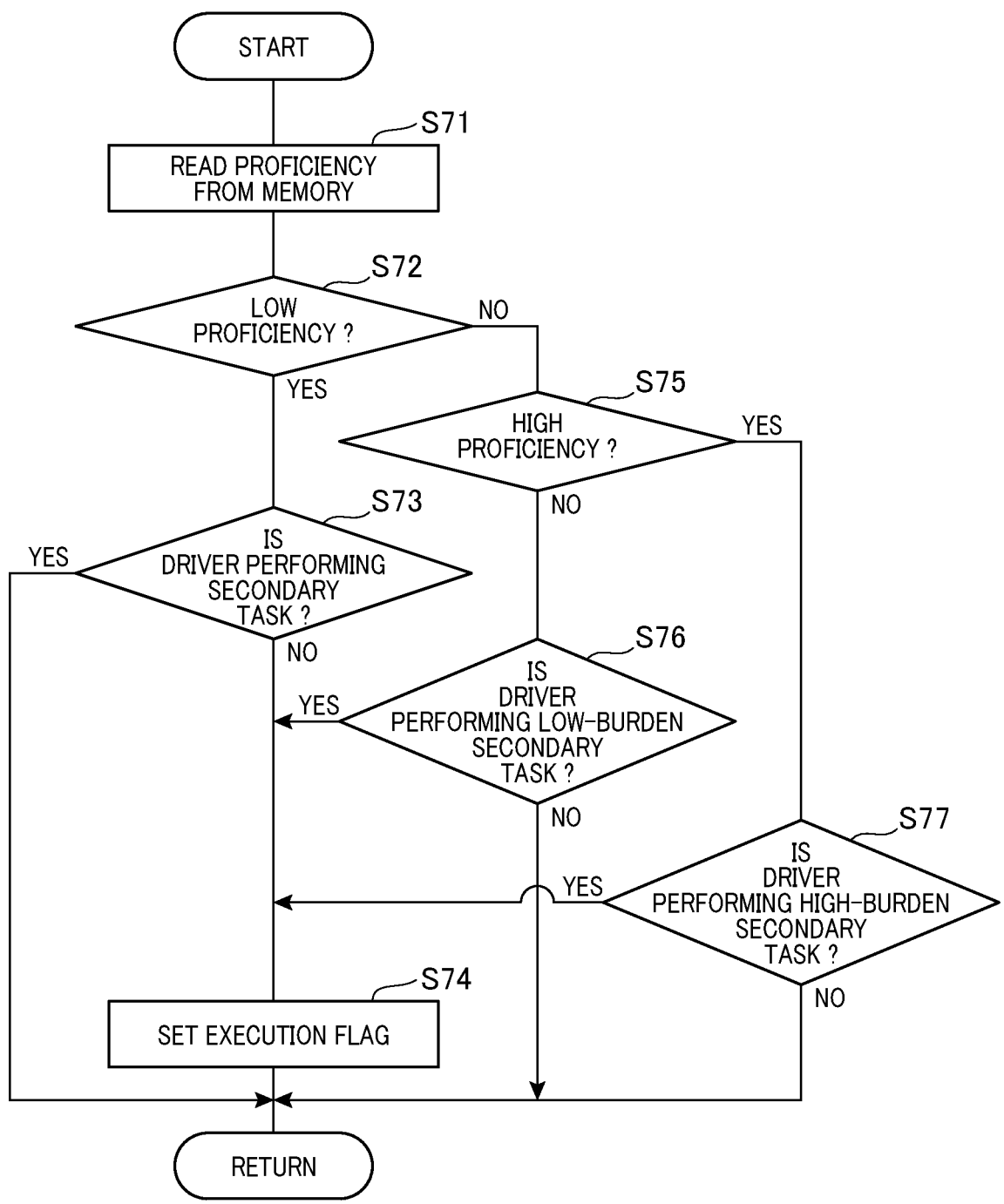

INFORMATION PROCESSING APPARATUS

CROSS REFERENCE TO RELATED APPLICATION

The present international application is a national stage application under 35 U.S.C. § 371(c) of PCT Application No. PCT/JP2017/016999, filed on Apr. 28, 2017, which claims priority based on Japanese Patent Application No. 2016-091739 filed to the Japan Patent Office on Apr. 28, 2016, and the entire descriptions of Japanese Patent Application No. 2016-091739 are incorporated herein by reference.

TECHNICAL FIELD

The present disclosure relates to an information processing apparatus which carries out automated driving of a vehicle.

BACKGROUND ART

Regarding a driving control system capable of switching between automated driving and manual driving, which requires driver's operation, while the vehicle is traveling, PTL 1 specified below proposes a technique that gradually increases intensity of the intervention of the system in order to smoothly switch from manual driving to automated driving.

CITATION LIST

Patent Literature

[PTL 1] JP-T-2010-501394

SUMMARY OF THE INVENTION

Switching from manual driving to automated driving occurs in a situation where a driver is performing driving operation, and thus the driver can calmly respond to the switching. On the other hand, when automated driving is switched to manual driving, the driver may be required to respond promptly or may not be prepared for it. The inventor conducted a detailed examination, and found out that a driver that is not accustomed to the switching may feel uneasy about the switching operation or feel rushed upon the operation, and therefore smooth switching may be hindered.

One aspect of the present disclosure is preferably able to provide a technique that aids a driver to be more accustomed to switching from automated driving to driving operation by the driver.

An aspect of the present disclosure is an information processing apparatus installed in a vehicle, including a driving control section and a preparation control section.

The driving control section is configured to execute automated driving of the vehicle. The preparation control section is configured to execute, when the automated driving is being executed by the driving control section, preparation control which is control that stops at least a part of the automated driving and makes a driver perform a preparation (training) switching to driving by the driver of the vehicle.

According to such a configuration, since a preparation of switching from automated driving to driving operation by the driver is executed, it is possible to aid the driver to become more accustomed to the above-described switching. Therefore, the driver can safely and smoothly switch to driving operation by the driver when automated driving is stopped.

It is to be noted that the reference numbers in parentheses in the claims merely indicate relationships between those elements and specific means described in the embodiment described below as one mode of the present disclosure, and they do not limit the technical scope of the present disclosure.

BRIEF DESCRIPTION OF THE DRAWINGS

FIG. 10 is a flowchart of main processing of a second embodiment.

FIG. 11 is a flowchart of the execution determination processing.

DESCRIPTION OF THE EMBODIMENTS

An embodiment for implementing the present disclosure will be described with reference to the drawings.

1. First Embodiment

[1-1. Configuration]

A driving control system 1 is a system installed in a vehicle such as an automobile to realize automated driving of the vehicle. Unless otherwise specified, automated driving as used in the following description indicates driving control that automatically carries out driving control such as vehicle speed control, braking control, steering control, and the like so as to enable navigation without requiring driver's operation.

The driving control system 1 can switch the driving of the vehicle from automated driving to driving operation by the driver and switch from driving operation by the driver to automated driving. In the following, such switching of the driving entity will be described as transfer of driving authority or authority transfer.

Figure 1:
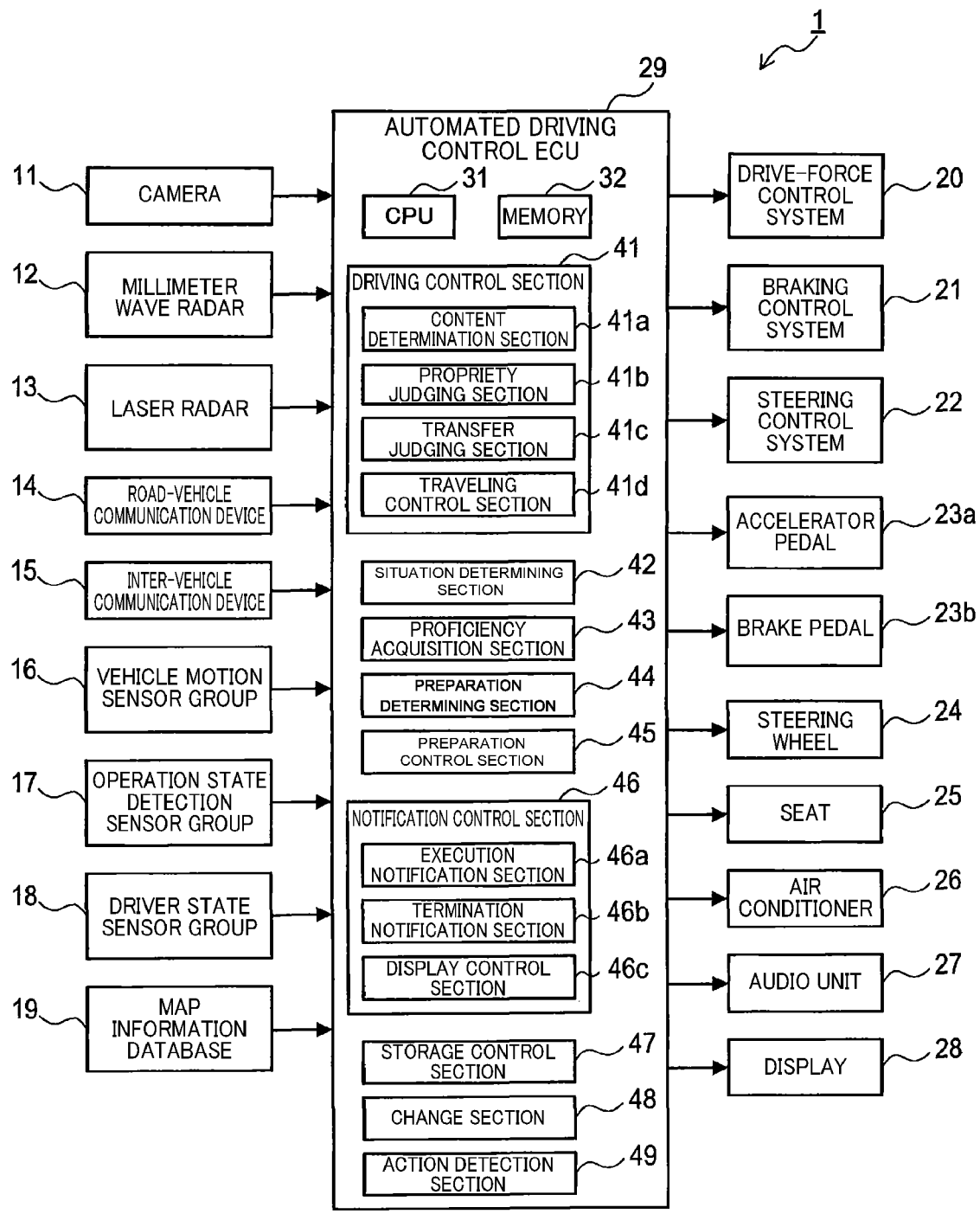
FIG. 1 is a block diagram showing a configuration of a driving control system.

As shown in FIG. 1, the driving control system 1 includes an automated driving control ECU 29 (hereinafter, ECU 29). Further, as elements for outputting information or the like mainly to the ECU 29, the driving control system 1 includes a camera 11, a millimeter wave radar 12, a laser radar 13, a road-vehicle communication device 14, an inter-vehicle communication device 15, a vehicle motion sensor group 16, an operational state detection sensor group 17, a driver state sensor group 18, and a map information database 19. Further, as elements mainly controlled by the ECU 29, the driving control system 1 includes a drive-force control system 20, a brake control system 21, a steering control system 22, an accelerator pedal 23*a*, a brake pedal 23*b*, a steering wheel 24, a seat 25, an air conditioner 26, an audio unit 27, and a display 28.

The camera 11 is an imaging device for capturing an image of the outside of the vehicle, and for example, it may be a known CCD image sensor, a CMOS image sensor, or the like.

The millimeter wave radar 12 and the laser radar 13 are sensors for detecting objects existing around the vehicle.

The road-vehicle communication device 14 performs wireless communication with an information transmitting devices provided to roads. Information such as traffic information is transmitted from the information transmitting devices.

The inter-vehicle communication device 15 performs wireless communication with an in-vehicle device installed in a nearby vehicle. The in-vehicle device transmits information such as information on the traveling of the vehicle in which the in-vehicle device is installed, or information on the outside of the vehicle acquired by that vehicle. The inter-vehicle communication device 15 also transmits similar information to the in-vehicle device.

The above-described camera 11, the millimeter wave radar 12, the laser radar 13, the road-vehicle communication device 14, and the inter-vehicle communication device 15 function as an information acquisition section that acquires information on the outside of the vehicle. The information on the outside of the vehicle acquired by the information acquisition section will be hereinafter also simply referred to as surrounding environment information.

The vehicle motion sensor group 16 includes a plurality of sensors outputting information in accordance with a motion state of the vehicle, such as a yaw rate sensor and an acceleration sensor.

The operational state detection sensor group 17 includes a plurality of sensors for detecting a state of driving operation by the driver. Specifically, the operational state detection sensor group 17 includes a sensor for detecting the operation amount of the accelerator pedal 23*a* and the brake pedal 23*b*, a sensor for detecting contact with the steering wheel 24 and an operation angle thereof, a camera for capturing an image of the driver, and a sensor for detecting switch operation by the driver.

The driver state sensor group 18 includes a plurality of sensors for outputting information in accordance with a state of the driver other than driving operation. More specifically, the driver state sensor group 18 includes a plurality of sensors for detecting a position and movement of driver's body parts such as a head, a body, an arm, and a foot, a driver's health condition, driver's awareness, line of sight, and the like.

The map information database 19 stores map data including road data indicating road positions and lane information, position data indicating positions of intersections, railroad crossings, and the like, classification and position information of facilities, and various data necessary for map display.

The drive-force control system 20 includes a power generation device such as an engine, a motor, or the like for propelling the vehicle, a transmission for converting rotation speed and torque and transmitting power, and a control device that controls these components in accordance with instructions from the ECU 29. The drive-force control system 20 performs adjustment of traveling speed of the vehicle and control of acceleration and deceleration.

The brake control system 21 has an actuator for driving the brake and a control device for controlling operation of the actuator in response to commands from the ECU 29, thereby controlling braking of the vehicle.

The steering control system 22 has an actuator for controlling an angle of steering of the vehicle's tires and a control device for controlling operation of the actuator in response to commands from the ECU 29, thereby controlling steering of the vehicle.

The accelerator pedal 23*a* is a pedal for the driver to control the speed of the vehicle.

The brake pedal 23*b* is a pedal for the driver to control the brake.

The steering wheel 24 is a device adopting a so-called by-wire technique. When the driver is authorized to drive, the actuator of the steering control system 22 is driven according to operation of the steering wheel 24 by the driver. On the other hand, during automated driving, even if the driver operates the steering wheel 24, it does not affect the steering. Note that the steering wheel 24 is provided with an actuator that automatically operates the steering wheel 24 according to commands from the ECU 29 when the authority is transferred.

Note that the steering wheel 24 does not need to be one employing the by-wire technique but may be mechanically linked so that a steering angle of the tires changes according to rotation of the steering angle 24. In particular, in such a configuration, an actuator such as a motor that applies torque to the shaft of the steering wheel 24 to reduce a steering burden of the driver may be used as the actuator for operating the steering wheel 24 in response to commands from the ECU 29.

The seat 25 is a seat on which the driver sits, and a part of the driver state sensor group 18 is attached thereto.

The air conditioner 26 adjusts the temperature inside the vehicle.

The audio unit 27 is a device that outputs a sound, and is capable of reproducing music or issuing a warning or notification in response to instructions from the ECU 29. The warnings and notifications may be realized by outputting voice messages indicating specific contents thereof, or melodies or beep sounds set in advance corresponding to the contents.

The display 28 is a device having a display screen such as a liquid crystal display capable of displaying an image, and it displays an image in response to commands from the ECU 29. The audio unit 27 and the display 28 correspond to a notification device. Further, the display 28 corresponds to a display device.

The ECU 29 includes a microcomputer having a CPU 31 and a semiconductor memory such as RAM, ROM, or flash memory (hereinafter, memory 32). The various functions of the ECU 29 are realized by the CPU 31 executing a program stored in a non-transitory tangible recording medium. In this example, the memory 32 corresponds to the non-transitory tangible recording medium storing a program. Further, a method corresponding to a program is executed by execution of the program. The ECU 29 may include one or a plurality of microcomputers.

The ECU 29 includes, as a configuration of functions realized by the CPU 31 executing programs, a driving control section 41, a situation determination section 42, a proficiency acquisition section 43, a preparation determination section 44, a preparation control section 45, a notification control section 46, a storage control section 47, a change section 48, and an action detection section 49. The way of realizing these elements in the ECU 29 is not limited to software, and a part or all of the elements may be realized by using hardware combining logic circuits, analog circuits, and the like.

The driving control section 41 carries out automated driving of the vehicle. The driving control section 41 includes a content determination section 41a, a propriety determination section 41b, a transfer determination section 41c, and a traveling control section 41d.

The content determination section 41a determines a target of control related to automated driving, that is, how to drive the vehicle. The content determination section 41a has a function of a navigation system, and determines a traveling route by using a GPS receiver, which is not shown, and information in the map information database 19. Further, the content determination section 41a determines traveling speed, a traveling lane, and the like based on the above-described surrounding environment information and the like.

The propriety determination section 41b determines whether automated driving is possible or not. In addition, the propriety determination section 41b determines which of the following cases (i) to (iii) is the reason why it is impossible.

(i) The case where continuing automated driving gradually becomes difficult. For example, the weather is bad and recognition accuracy of the sensors for acquiring surrounding environment information declines.

(ii) The case where the automated driving section ends. In other words, the case where the point at which the automated driving ends is acquired in advance, and the vehicle reaches that point. For example, the vehicle is approaching the destination set by the driver or is entering a section defined in advance as a section in which automated driving cannot be performed.

(iii) The case where automated driving is terminated immediately. For example, a failure occurs in a sensor or an actuator, sudden congestion is caused by an accident or the like, or the road acquired from the road data is different from the road indicated by the surrounding environment information.

Depending on which of the patterns (i) to (iii) is indicated by the propriety decision section 41b, the procedure of stopping the automated driving differs. The details of the specific process of stopping the automated driving will be described later.

The transfer decision section 41c determines whether or not the driver is in a driving capable state in which the driver can perform driving operation before transferring authority from automated driving to manual driving. The driving capable state can be, for example, a state in which one or more of the following requirements are satisfied. The requirements are, for example, that the driver is operating the steering wheel 24, the driver is operating the accelerator pedal 23a or the brake pedal 23b, the driver is in the correct driving posture, and the driver is performing a certain switch operation. The method of determining whether or not it is a driving capable state is not limited to the above.

The traveling control section 41d controls the drive-force control system 20, the braking control system 21, and the steering control system 22 based on the object of control related to automated driving determined by the content determination section 41a.

Based on the surrounding environment information, the situation determining section 42 determines whether or not the vehicle is in a situation suitable for an authority transfer preparation (training). The authority transfer preparation is a preparation (training) of stopping at least a part of the automated driving and transferring the driving authority to the driver when automated driving is being executed under the control of the traveling control section 41d and the propriety decision section 41b has determined that automated driving is possible. The conditions required to be determined as a situation suitable for the authority transfer preparation are that there is no other vehicle in the vicinity of the vehicle and that it is predicted that the vehicle will be continuously driven at a constant speed for a certain period of time. The conditions for this determination are not limited to the above example, and various conditions may be set. For example, the weather, the time, the presence or absence of a passenger, the time period for which the driver has continued driving, and the like may be used as the conditions.

The proficiency acquisition section 43 acquires the proficiency, that is, the degree of proficiency of the authority transfer preparation. The proficiency is represented by a value that is added or subtracted by the driver performing the authority transfer preparation. The specific calculation method of the proficiency will be described in connection with preparation execution processing described later.

Figure 2:
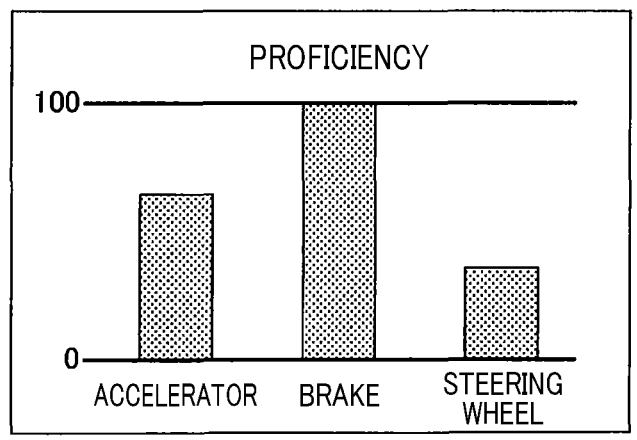
FIG. 2 is a diagram for describing an example of proficiency displayed on a display.

FIG. 2 shows an example of an image indicating the proficiency displayed on the display 28. For each of the items displayed as an accelerator, a brake, and a steering wheel, for example, the proficiency is displayed as a parameter ranging from 0 to 100. The accelerator parameter indicates the proficiency regarding operation of the accelerator pedal 23a in the authority transfer. The brake parameter indicates the proficiency regarding operation of the brake pedal 23b in the authority transfer. The steering wheel parameter indicates the proficiency regarding operation of the steering wheel 24 in the authority transfer. In the following description, the term "items" indicate distinction of the accelerator, brake, and steering wheel in relation to the authority transfer preparation or the proficiency thereof. It should be noted that the above-described parameters are not limited to between 0 and 100, but may be, for example, between 0 and 1, or may be indicated in stages other than numerical values such as low, middle, and high.

The preparation determining section 44 determines whether or not to execute authority transfer preparation control (hereinafter referred to as preparation control) which is control for causing the driver to perform the authority transfer preparation, based on the determination result of the situation determining section 42 and the proficiency acquired by the proficiency acquisition section 43.

Whether or not to execute the preparation (training) control is determined according to the proficiency. In the present embodiment, if the proficiency is 100, the preparation control is not executed, and if the proficiency is not 100, the preparation control is executed. It should be noted that the value of the proficiency corresponding to the threshold for determining whether or not the preparation control is executed is not limited to 100, but can be set to any value. In addition, the frequency of preparation control may be changed depending the proficiency. For example, it is possible to set the frequency of preparation control so that the frequency increases as the proficiency decreases, and the frequency decreases as the proficiency increases. Further, the conditions of the surrounding environment information for determining that the situation is suitable for the preparation control at the situation determining section 42 may be changed based on the proficiency.

The preparation determining section 44 determines to execute preparation control when the vehicle is in a situation suitable for the authority transfer preparation and there is any item of which the proficiency is not 100.

The preparation control section 45 executes preparation control when it is determined by the preparation determining section 44 that preparation control should be executed. The preparation control executed by the preparation control section 45 indicates stopping all or a part of the automated driving control, and is control similar to the control for carrying out authority transfer to the driver when it is determined that the automated driving is not possible by the propriety decision section 41*b*. Known control may be adopted for the control for carrying out authority transfer.

The notification control section 46 causes the notification device configured to be able to notify the passenger in the vehicle, that is, the audio unit 27 and the display 28 to execute notification of various pieces of information. The notification control section 46 functions as an execution notification section 46*a*, a termination notification section 46*b*, and a display control section 46*c*.

The execution notification section 46*a* executes start notification which is notification of starting the preparation control, and execution notification which is notification that the preparation control is being executed.

The termination notification section 46*b* executes termination notification which is notification of the termination of the automated driving by the driving control section 41 for reasons other than the preparation control.

The display control section 46*c* causes the display 28 to display the proficiency. The proficiency is displayed when a passenger performs an input operation for displaying the proficiency on a touch panel or the like (not shown).

The storage control section 47 causes the memory 32, which is a storage device constituting a storage area capable of storing information, to store authority transfer time t which is the time it took from the notification of the start notification to the transfer of authority in the authority transfer preparation. The authority transfer time t corresponds to time information.

The change section 48 changes the proficiency in response to input operation by a passenger of the vehicle. The passenger of the vehicle can adjust the setting so that execution of the preparation control is suppressed by raising the proficiency, or so that the preparation control is executed or the frequency is raised by reducing the proficiency.

The action detection section 49 detects some predetermined actions among actions of the driver of the vehicle other than driving the vehicle.

[1-2. Control by Automated Driving Control ECU]

In the driving control system 1 of the present embodiment, the ECU 29 executes control related to the authority transfer preparation, and control of changing the timing of the notification of termination of automated driving in cases other than the authority transfer preparation based on the result of the authority transfer preparation.

[1-2-1. Control Related to Authority Transfer Preparation]

<Main Processing>

Figure 3:
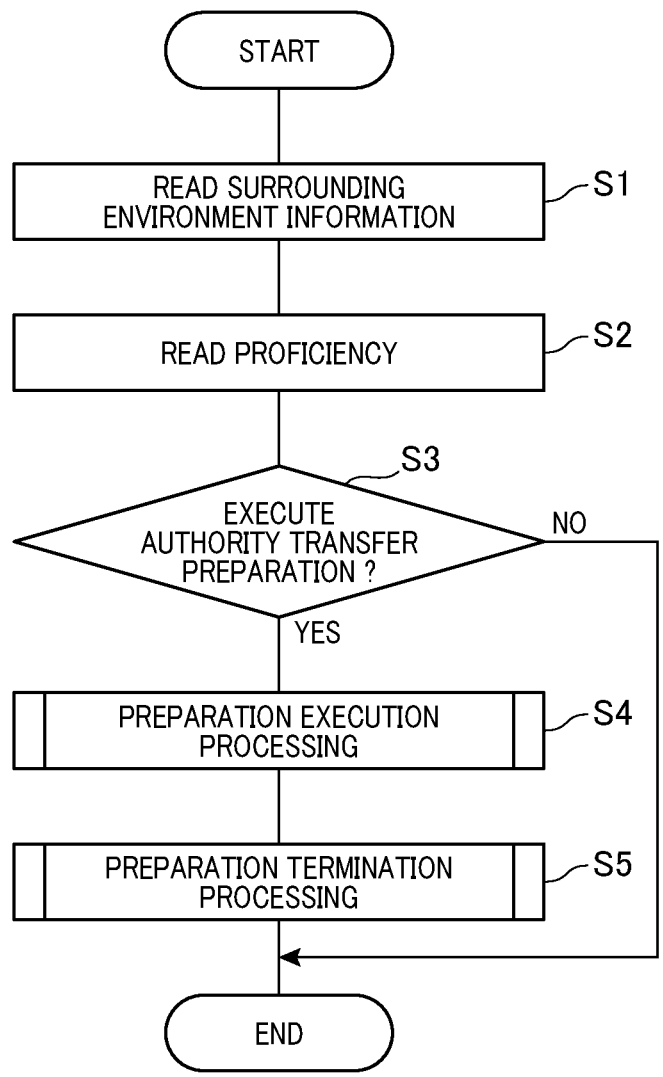
FIG. 3 is a flowchart of main processing of a first embodiment.

Main processing executed by the CPU 31 of the ECU 29 will be described with reference to a flowchart in FIG. 3. This processing is executed when automated driving is started by the driving control section 41 and a certain time period has passed.

First, in S1, the CPU 31 reads the surrounding environment information from each of the sensors and communication devices constituting the information acquisition section described above.

In S2, the CPU 31 reads the proficiency from the memory 32.

In S3, the CPU 31 determines whether or not to make the driver perform the authority transfer preparation, that is, whether or not to execute the preparation control. The processing of S1 to S3 is processing performed by the situation determining section 42, the proficiency acquisition section 43, and the preparation determining section 44. In S3, when it is determined that the vehicle is in a situation suitable for the authority transfer preparation based on the surrounding environment information, and there is any item with proficiency that is not 100, the CPU 31 determines to make the driver perform the authority transfer preparation. The determination criterion of the situation determining section 42 may be changed in accordance with the proficiency. For example, when the proficiency is to high, the driver may be forced to perform the authority transfer preparation in a situation where relatively complicated driving operation or situation confirmation is required, such as a situation where there is a vehicle in the vicinity or fine steering operation is required.

In S3, when it is determined to make the driver perform the authority transfer preparation, the processing proceeds to S4. On the other hand, when it is not determined to make the driver perform the authority transfer preparation, the present processing ends.

In S4, the CPU 31 performs the preparation execution processing. The details of the preparation execution processing will be described later.

In S5, the CPU 31 performs the preparation termination processing. The details of the preparation termination processing will be described later. After S5, the present processing ends.

<Preparation Execution Processing>

Figure 4:
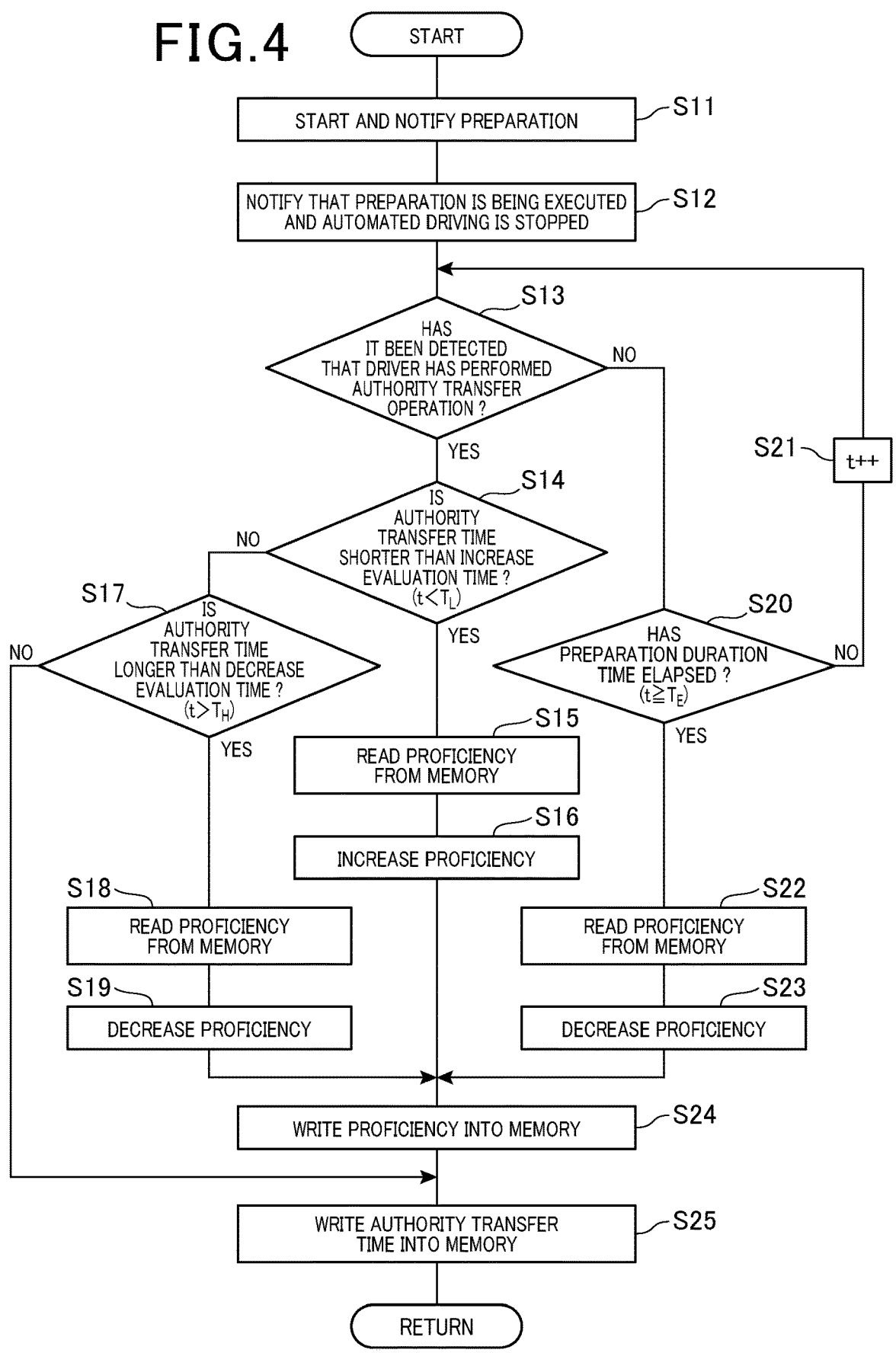
FIG. 4 is a flowchart of preparation execution processing.

The preparation execution processing executed by the CPU 31 of the ECU 29 will be described with reference to a flowchart in FIG. 4. This processing is started at S4 of the main processing in FIG. 3.

Figure 5:
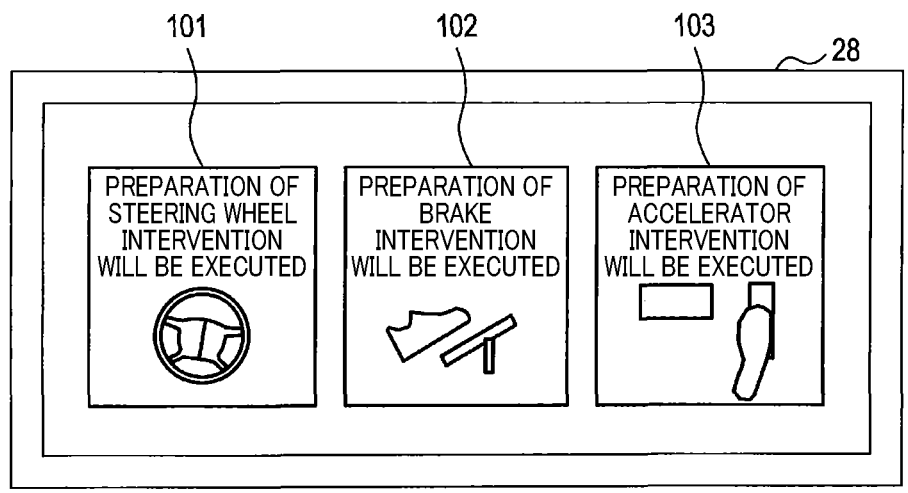
FIG. 5 is an explanatory view showing an example of a notification image for notifying start of an authority transfer preparation.

In S11, the CPU 31 starts the preparation control and executes start notification for notifying the driver of the start. Specifically, the CPU 31 causes the display 28 to display one or more of the notification images 101 to 103 shown in FIG. 5 in accordance with the item for which the preparation control is executed, and causes the audio unit 27 to output a sound announcing the start of the authority transfer preparation.

Figure 6:
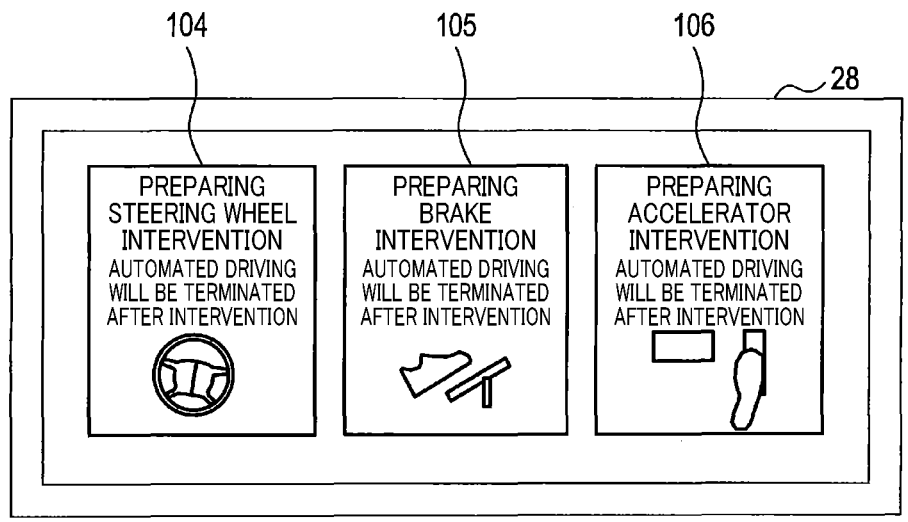
FIG. 6 is an explanatory view showing an example of a notification image for notifying that the authority transfer preparation is being executed.

In S12, the CPU 31 performs execution notification, which is notification for notifying that the preparation control is being executed, and notification for notifying the driver of stopping of the automated to driving after the authority transfer. Specifically, the CPU 31 causes the display 28 to display one or more of the notification images 104 to 107 shown in FIG. 6 and causes the audio unit 27 to issue an audible notification.

In S13, the CPU 31 determines whether or not authority transfer operation by the driver has been detected. Here, it determines whether or not the driver is in the above-described driving capable state in which the driver can perform driving operation with regard to the item for which the authority transfer preparation is to be executed. For example, when it is detected by the operation state detection sensor group 17 that the driver has gripped the steering wheel 24, the driver has manipulated the accelerator pedal 23*a* or the brake pedal 23*b*, or the like, it is determined that the state is a driving capable state. The authority transfer time t is the time period from the start notification in S11 to the detection of the authority transfer operation described above.

In S13, when it is determined that authority transfer operation by the driver has been detected, the processing proceeds to S14. On the other hand, when it is not determined that authority transfer operation by the driver has been detected, the processing proceeds to S20.

In S14, the CPU 31 determines whether or not the authority transfer time t is shorter than an increase evaluation time TL. The increase evaluation time TL is a time period serving as a criterion for evaluation that increases the proficiency. When the authority transfer time t is shorter than the increase evaluation time TL, the processing proceeds to S15. On the other hand, when the authority transfer time t is not shorter than the increase evaluation time TL, the processing proceeds to S17.

In S15, the CPU 31 reads the proficiency of the item corresponding to the preparation control that has been executed in S11 from the memory 32.

In S16, the CPU 31 increases the proficiency read in S15. The increment may be a fixed value or may be a value that varies according to the authority transfer time t. For example, the increment P+ may be set as P+=K+×(TL−t), using a predetermined coefficient K+. After S16, the processing proceeds to S24.

In S17, the CPU 31 determines whether or not the authority transfer time t is longer than a decrease evaluation time TH. The decrease evaluation time TH is a time period serving as a criterion for evaluation that decreases the proficiency, and is set so that "increase evaluation time TL≤decrease evaluation time TH" holds. When the authority transfer time t is longer than the decrease evaluation time TH, the processing proceeds to S18. On the other hand, when the authority transfer time t is not longer than the decrease evaluation time TH, the processing proceeds to S25.

In S18, the CPU 31 reads the proficiency of the item corresponding to the preparation control that has been executed in S11 from the memory 32.

In S19, the CPU 31 decreases the proficiency read in S18. The decrement may be a fixed value or may be a value that varies according to the authority transfer time t. For example, the decrement P− may be set as P−=K−×(t−TH), using a predetermined coefficient K−. After S19, the processing proceeds to S24.

In S20, the CPU 31 determines whether or not the authority transfer time t has exceeded a preparation duration time TE. The preparation duration time TE is the time period for which the preparation control is continued, and the authority transfer preparation is terminated after a lapse of this time. The preparation duration time TE is set so that "decrease evaluation time TH<preparation duration time TE" holds. When the authority transfer time t has exceeded the preparation duration time TE, the processing proceeds to S22. When the authority transfer time t has not exceeded the preparation duration time TE, the processing proceeds to S21.

In S21, the processing returns to S13 after some lapse of time.

In S22, the CPU 31 reads the proficiency of the item corresponding to the preparation control that has been executed in S11 from the memory 32.

In S23, the CPU 31 decreases the proficiency read in S22. Note that the decreasing performed in S19 may be smaller than the decreasing performed in S23.

In S24, the CPU 31 writes into the memory 32 the proficiency increased or decreased in S16, S19, S23. As a result, the proficiency will be increased or decreased.

In S25, the CPU 31 writes the authority transfer time t into the memory 32 for each item of the authority transfer preparation. The memory 32 also stores the authority transfer time t of the past authority transfer preparations, and can acquire an average or the amount of change of the driver's authority transfer time t for each item based on these pieces of information.

<Preparation Termination Processing>

Figure 7:
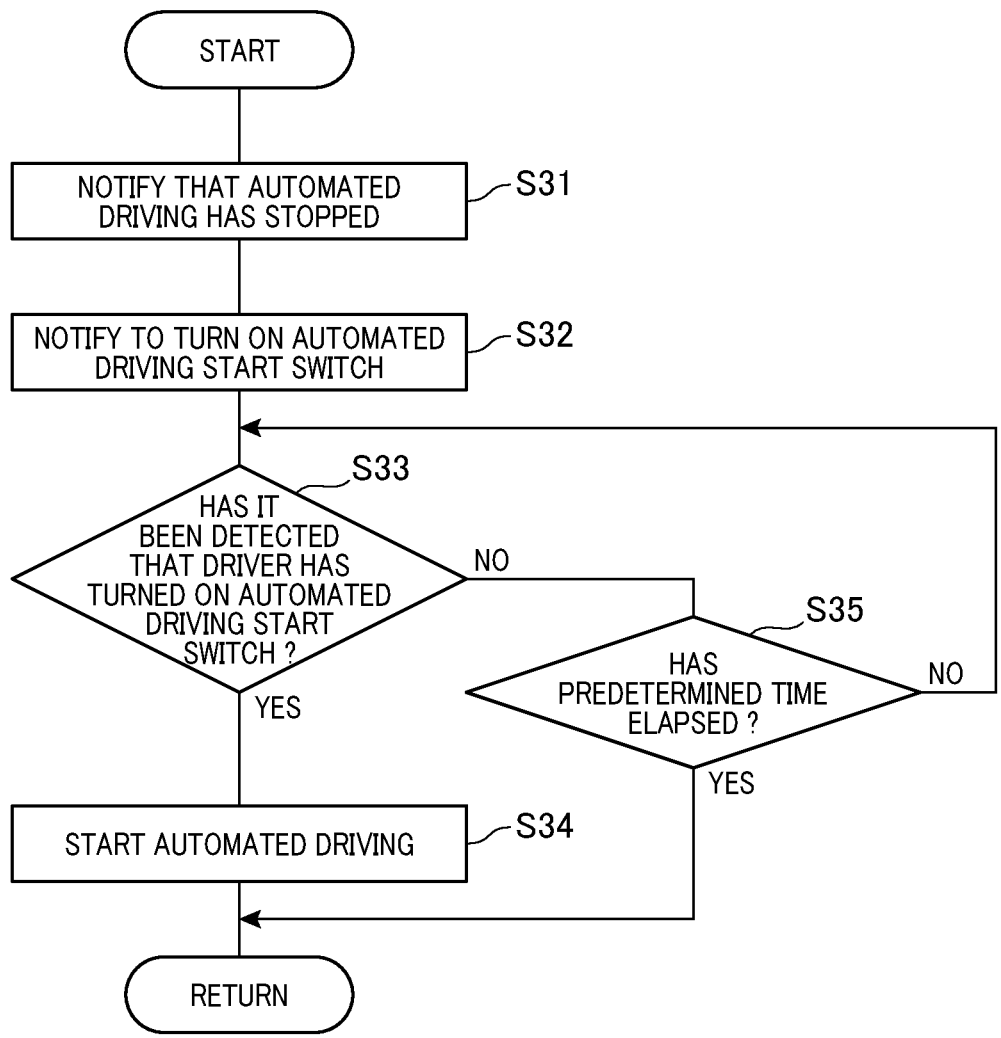
FIG. 7 is a flowchart of preparation termination processing.

The preparation termination processing executed by the CPU 31 of the ECU 29 will be described with reference to a flowchart in FIG. 7. This processing is started at S5 of the main processing in FIG. 3.

In S31, the CPU 31 notifies the driver that the automated driving has stopped by the preparation control by using the display 28 and the audio unit 27.

Figure 8:
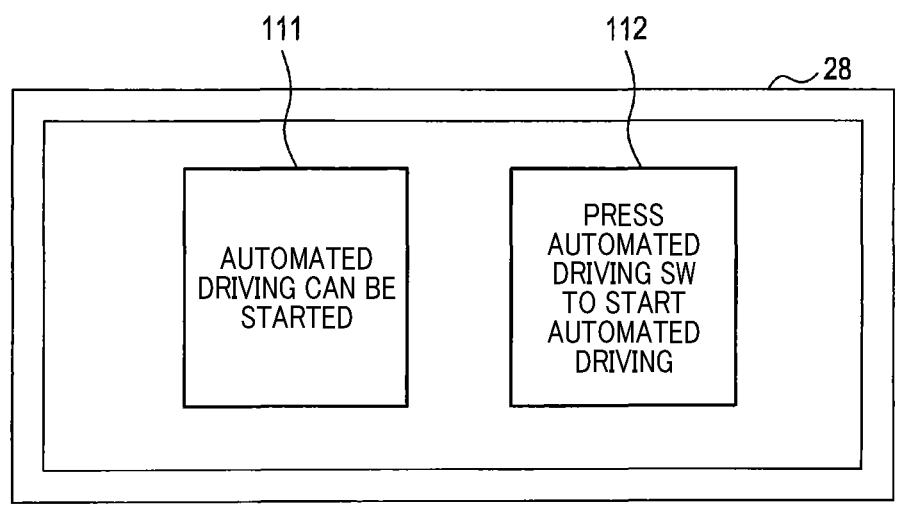
FIG. 8 is an explanatory view showing an example of a notification image for guiding start of automated driving.

In S32, the CPU 31 notifies the driver to turn on an automated driving start switch, in order to restart the automated driving stopped by the preparation control. For example, the CPU 31 causes the display 28 to display one or more of the notification images 111 to 112 shown in FIG. 8 and causes the audio unit 27 to issue audible guidance that prompts the driver to operate the automated driving start switch. When the driver turns on the automated driving start switch, which is not shown, provided in the vehicle, this operation is detected by the operation state detection sensor group 17.

In S33, the CPU 31 determines whether or not the driver's operation of turning on the automated driving start switch has been detected. When the operation is detected, the processing proceeds to S34. On the other hand, when the operation is not detected, the processing proceeds to S35.

In S34, the CPU 31 starts automated driving by the driving control section 41. After that, the processing ends.

In S35, the CPU 31 determines whether or not a predetermined time has elapsed since the notification in S32. If the predetermined time has elapsed, the CPU 31 terminates the notification in S32 without starting automated driving, and terminates the processing. If the predetermined time has not elapsed, the processing returns to S33.

[1-2-2. Control for Changing Timing of Notification of Termination of Automated Driving]

<Automated Driving Termination Processing>

Figure 9:
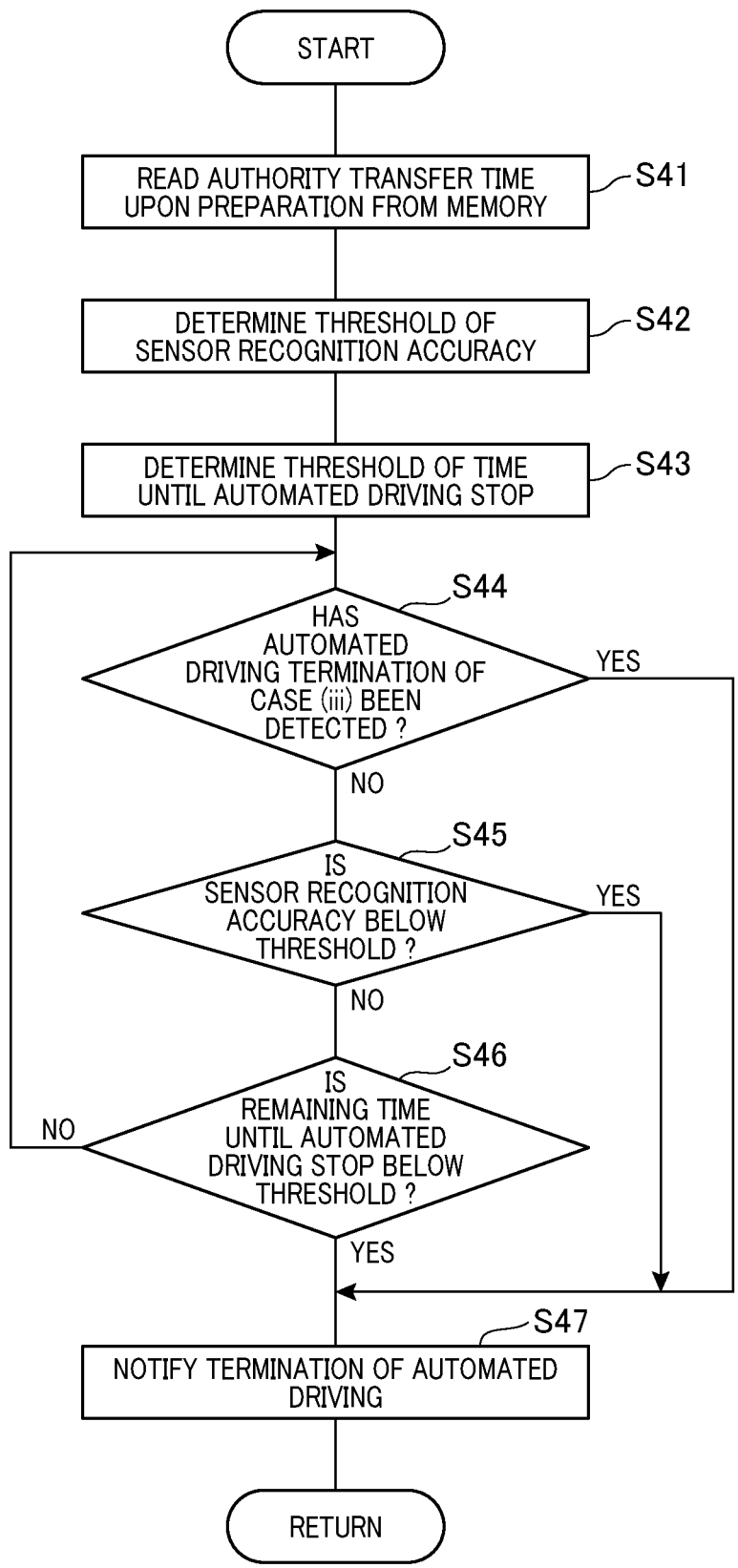
FIG. 9 is a flowchart of automated driving termination processing.

Automated driving termination processing executed by the CPU 31 of the ECU 29 will be described with reference to a flowchart in FIG. 9.

In S41, the CPU 31 reads a history of the authority transfer time t, which is the result of the authority transfer preparation, from the memory 32.

In S42, the CPU 31 determines a first threshold which is a threshold of sensor recognition accuracy. The first threshold is a threshold used when automated driving is stopped in the case of (i) described above, and in the present embodiment, it is a threshold of the recognition accuracy of the camera 11.

Instead of the recognition accuracy of the camera 11, the sensor recognition accuracy related to the threshold may be distance accuracy of the laser radar 13 or the millimeter wave radar 12, positioning accuracy of the GPS receiver, the number of satellites, or the like.

In S42, for a driver with a long authority transfer time t, that is, a driver who needs a long time for authority transfer, the first threshold is set so that the driver is notified of authority transfer earlier than the typical case. For example, whereas the notification of authority transfer is normally performed when the recognition accuracy of the camera 11 has reduced to 60%, for a driver having a long authority transfer time t, the notification of authority transfer is performed when the recognition accuracy reaches 80%.

The authority transfer time t when a preparation (training) is performed may be an average of a plurality of authority transfer times t acquired in the past. It is also possible to weight the respective past histories so that, for example, the latest authority transfer time is emphasized.

The way of determining the first threshold based on the authority transfer time t is not particularly limited, but for example, can be determined using a map or a function prepared in advance. The function can be a linear function, a quadratic function, an exponential function, or the like in which the threshold increases as the authority transfer time increases.

The first threshold may be adjusted based on a variation in the authority transfer time t. Specifically, the amount added to the threshold can be calculated based on variance of the past authority transfer times t. As with the above-described way of determining a threshold, the amount added may employ a function or map that increases as the variance of the authority transfer times increases.

In S43, the CPU 31 determines a second threshold which is a threshold of time until automated driving stop. The second threshold is a threshold used when automated driving is stopped in the case of (ii) described above. The time until automated driving stop can be rephrased as expected arrival time to the location where automated driving stops. This time is determined based on the distance to the location where automated driving stops, traveling speed, road conditions, or the like.

In S43, for a driver having a long authority transfer time t, the second threshold value is set so that notification of authority transfer is performed in a state where the expected arrival time has a large margin. As in S42, a function or a map can be used to set the second threshold.

The second threshold described above may be a threshold of the distance from the location of the vehicle to the location at which the automated driving ends.

In S44, the CPU 31 determines whether or not termination of automated driving in the case (iii) described above has been detected. When the termination of automated driving in the case (iii) is detected, the processing proceeds to S47. On the other hand, when such detection is not made, the processing proceeds to S45.

In S45, the CPU 31 determines whether or not the recognition accuracy of the camera 11 is lower than the first threshold set in S42. When it is determined that it is lower than the first threshold, the processing proceeds to S47. On the other hand, when it is not determined that it is lower than the threshold, the processing proceeds to S46.

In S46, the CPU 31 determines whether or not the remaining time until automated driving stop is lower than the threshold set in S43. When it is determined that it is lower than the threshold, the processing proceeds to S47. On the other hand, when it is not determined that it is lower than the threshold, the process returns to S44.

In S47, the CPU 31 uses the display 28 and the audio unit 27 to issue termination notification which is a notification for notifying termination of automated driving. In this termination notification, the driver is notified that automated driving terminates and is guided to start driving operation. After that, the processing ends.

Thus, the timing of termination notification varies depending on the first threshold and the second threshold set according to the authority transfer time t. In other words, termination notification is executed at timing set based on the authority transfer time t.

Note that, although the driving control section 41 transfers authority to the driver after S47, it may be configured to continue automated driving within a possible range. For example, when some functions can continue to be controlled by the driving control section 41, for those functions, the timing of stopping may be delayed or the control may not be stopped.

As a specific example, even when a failure occurs in the laser radar 13, which is a sensor for realizing lane change by automated driving, if the camera 11 for monitoring the front is operating normally, the function of running within the lane can be maintained. Therefore, it is possible to extend the time for the function of running within the lane, and transfer authority to the driver during the extended time.

[1-3. Effects]

According to the first embodiment described above in detail, the following effects can be obtained.

(1a) The driving control system 1 can aid the driver to become more accustomed to authority transfer by performing preparation control. Therefore, the driver can perform authority transfer safely and smoothly when automated driving ends when the vehicle is running automatically.

(1b) The preparation control is executed on the premise that the vehicle is in a relatively safe situation. Therefore, the driver can calmly perform authority transfer.

(1c) The driver is notified that it is a preparation (training) for authority transfer. Therefore, it is possible to prevent the driver from misunderstanding that authority transfer is going to be carried out due to vehicle trouble or a problem in the traveling route, and the driver can calmly perform the authority transfer preparation.

(1d) Since the result of the authority transfer preparation is stored as the proficiency, the driver can learn his or her proficiency, and the driving control system 1 can suppress execution of unnecessary authority transfer preparation.

(1e) Since the timing of executing the termination notification is determined based on the authority transfer time t stored in the memory 32, it is possible to execute the termination notification at timing matching with the skill of the driver.

2. Second Embodiment

[2-1. Differences from First Embodiment]

Since the basic configuration of the second embodiment is similar to that of the first embodiment, the description of the common parts will be omitted, and the differences will be mainly described. Reference numbers that are the same as those of the first embodiment denote structures that are the same, and the preceding descriptions should be referred to.

[2-2. Control by Automated Driving Control ECU]

In the first embodiment, a configuration example is shown which determines whether or not to perform preparation control based on the determination result of the situation determining section 42 and whether or not the proficiency is 100. On the other hand, in the second embodiment, it is determined whether or not to perform preparation control, taking into account the presence or absence of a secondary task of the driver.

The secondary task is an action other than the driving operation performed by the driver, and is detected by the action detection section 49. This secondary task corresponds to a predetermined action. In this embodiment, the secondary task is classified into two groups.

The first is a group of actions that can be performed even during normal driving operation. Examples are operation of the car navigation system, operation of the air conditioner, operation of the audio unit, and eating and drinking with one hand. Hereinafter, these operations will also be described as low-burden secondary tasks.

The second is a group of actions which can occur only when automated driving is being performed and in which the driver performs directing his or her eyes and concentration to something other than driving. Examples are operation of a portable terminal such as a mobile phone and reading. Hereinafter, these operations will also be described as high-burden secondary tasks.

<Main Processing>

Next, main processing executed, instead of the main processing of the first embodiment, by the ECU 29 of the second embodiment will be described with reference to a flowchart of FIG. 10. This processing is different from the main processing of FIG. 3 in that processing of S61 is performed instead of S2, and processing of S62 is performed instead of S3.

In S61, the CPU 31 performs execution determination processing. In this processing, as will be described in detail later, an execution flag is set when it is determined to permit execution of the authority transfer preparation based on the proficiency and the secondary task. After that, the processing proceeds to S62.

In S62, the CPU 31 determines whether or not to make the driver perform the authority transfer preparation, that is, whether or not to execute the preparation control. Here, when the situation determining section 42 determines that the vehicle is in a situation suitable for the authority transfer preparation based on the surrounding environment information obtained in S1, and the execution flag is set in S61, the CPU 31 determines to execute the preparation control. In S62, when it is determined to make the driver perform the authority transfer preparation, the processing proceeds to S4. On the other hand, when it is not determined to make the driver perform the authority transfer preparation, the processing ends.

<Execution Determination Processing>

The execution determination processing executed by the CPU 31 of the ECU 29 will be described with reference to a flowchart of FIG. 11. This processing is started at S61 of the main processing in FIG. 10.

In S71, the CPU 31 reads the proficiency of one of the items of the preparation control from the memory 32.

In S72, the CPU 31 determines whether or not the proficiency is low. For example, when the proficiency is in a range of 0 to 20, it is determined that the proficiency is low. When it is determined that the proficiency is low, the processing proceeds to S73. On the other hand, when it is not determined that the proficiency is low, the processing proceeds to S75.

In S73, the CPU 31 determines whether or not the driver is executing a secondary task. When a low-burden or high-burden secondary task is being executed, the processing ends without setting the execution flag. When the secondary task is not being executed, the processing proceeds to S74.

In S74, the CPU 31 sets the execution flag. After that, the processing ends.

In S75, the CPU 31 determines whether or not the proficiency is high. For example, when the proficiency is in a range of 70 to 100, it is determined that the proficiency is high. When it is determined that the proficiency is high, the processing proceeds to S77. On the other hand, when it is not determined that the proficiency is high, the processing proceeds to S76.

In S76, the CPU 31 determines whether or not the driver is executing a low-burden secondary task. When it is determined that the driver is executing a low-burden secondary task, the processing proceeds to S74. On the other hand, when it is not determined that the driver is executing a low-burden secondary task, the processing ends.

In S77, the CPU 31 determines whether or not the driver is executing a high-burden secondary task. When it is determined that the driver is executing a high-burden secondary task, the processing proceeds to S74. On the other hand, when it is not determined that the driver is executing a high-burden secondary task, the processing ends.

That is, in this execution determination processing, if the proficiency is low, the CPU 31 sets the execution flag when a secondary task is not being executed. If the proficiency is medium, the CPU 31 sets the execution flag when a low-burden secondary task is being executed. If the proficiency is high, the CPU 31 sets the execution flag when a high-burden secondary task is being executed. Therefore, the higher the skill of the driver predicted from the proficiency, the more difficult a situation for quick driving operation the authority transfer preparation can be started in.

[2-3. Effects]

According to the second embodiment described above in detail, the following effects can be obtained in addition to the above-described effects (1a) to (1e) of the first embodiment.

(2a) Since the driving control system 1 executes the preparation control when a secondary task depending on the proficiency is being executed, the driving control system 1 can execute the preparation (training) under an appropriate burden matching with the skill of the driver.

3. Other Embodiments

Embodiments for implementing the present disclosure have been described above, but the present disclosure is not limited to the above-described embodiments and can be implemented with various modifications.

(3a) In the first embodiment, a configuration example is illustrated which determines whether or not to perform preparation control based on the surrounding environment information and the proficiency, and in the second embodiment, a configuration example is illustrated which makes the determination also taking into consideration the secondary task.

However, the conditions for starting the preparation control, that is, the conditions for the preparation determining section 44 to determine to start the preparation control are not limited to the conditions exemplified in the embodiments. Only a part of the exemplified conditions may be used as the conditions for starting the preparation control, or another condition may be required to be satisfied.

For example, in the first embodiment, whether or not to perform the preparation control may be determined based only on the fact that the situation determining section 42 has determined that the vehicle is in a situation suitable for the authority transfer preparation based on the surrounding environment information, or may be determined based only on a value of the proficiency. Further, in the second embodiment, the execution flag may be set based only on the presence or absence of a secondary task detected by the action detection section 49 without taking into account the proficiency.

In addition, the preparation control may be executed under another condition alone without taking into account any of the surrounding environment information, the proficiency, and the secondary task. The preparation control may be executed based on input operation for starting the authority transfer preparation made by the driver, for example, switch operation.

A driver with a high level of proficiency may be able to set the conditions for performing the authority transfer preparation. For example, when the proficiency of the driver is high, the driver may be able to set the condition for performing the authority transfer preparation from the high-burden secondary task (hereinafter referred to as high burden), the low-burden secondary task (hereinafter referred to as low burden), and no secondary task (hereinafter referred to as no burden).

Further, when the driver's proficiency is medium, the driver may be able to set the condition for performing the authority transfer preparation from low burden and no burden, and when the driver's proficiency is low, only no burden may be selectable.

(3b) The driving control system 1 may individually distinguish drivers, and store the proficiency and execute the preparation control based on the proficiency. The distinction of the drivers may be based on the various sensors of the driving control system 1 or may be made by input operation by the driver.

(3c) In the above-described embodiments, configuration examples are illustrated in which the preparation control is executed for stopping the automated driving entirely when automated driving is being executed by the driving control section 41. However, a part of the automated driving may be stopped, and the preparation control may be performed only for the part of control that has been stopped. For example, whereas the driving control section 41 executes the vehicle speed control, the braking control, and the steering control, it is possible to make the driver perform the authority transfer preparation that switches the driving operation corresponding to one or two of them to the driver.

(3d) In the above-described embodiments, configuration examples are illustrated in which the preparation control is executed when the vehicle speed control, the braking control, and the steering control are being executed, that is, when complete automated driving that does not require driving operation by the driver is being executed. However, the preparation control may be performed when partial automated driving, in which the driver performs a part of the driving operation, is being executed. That is, the automated driving as used in the present disclosure includes complete automated driving and partial automated driving.

Specifically, in a state where the driver is performing driving operation corresponding to one or two of the above controls, preparation control that stops the control corresponding to driving operation that is not being performed by the driver may be performed.

(3e) In the above-described embodiments, configuration examples are illustrated in which both the start notification and the execution notification are executed, but instead one of them may be executed.

(3f) The form of the proficiency is not limited to that exemplified in the above embodiments. For example, the proficiency may not be divided into items, and only one parameter may be given to the driver, or the proficiency may be further classified in more detail according to the driving environment or the like.

(3g) In the above-described embodiments, the timing at which the termination notification is executed changes based on the authority transfer time t stored in the memory 32. However, any parameter or information other than the authority transfer time t may be used as long as it is information on the time period from the start of the preparation control to the transfer of driving authority to the driver. For example, a plurality of stages of evaluation corresponding to the time until the transfer of driving authority to the driver may be used.

In addition, the authority transfer time t may not be the time from the start notification to the detection of the authority transfer operation, as long as it is time that indicates the quickness of reaching the state in which the driver can perform driving operation.

(3h) The device for notifying the driver or a passenger is not limited to the audio unit 27 and the display 28. For example, a lamp, which is not shown, an actuator, which is not shown, provided to the seat 25, or the air conditioner 26 may operate to notify the driver or the like of, for example, the start of authority transfer preparation.

(3i) The function of one element in the above embodiments may be distributed to a plurality of elements, or the functions of a plurality of elements may be integrated into one element. Further, a plurality of functions of a plurality of elements may be realized by a single element, or a single function realized by a plurality of elements may be realized by a single element. Furthermore, a part of the configuration of the above embodiments may be omitted. Furthermore, at least a part of the configuration of the above embodiment may be added or substituted in the configuration of the other embodiments described above. The embodiments of the present disclosure include any mode included in the technical spirit specified only by the language of the claims.

(3j) In addition to the above-described ECU 29, the present disclosure may be realized in various forms such as the driving control system 1 including the ECU 29 as an element, a program for allowing a computer to function as the ECU 29, a non-transitory tangible recording medium such as a semiconductor memory storing the program, and a preparation execution method.

The invention claimed is:

1. An information processing apparatus installed in a vehicle, comprising:
   a driving control section configured to execute automated driving of the vehicle;
   a preparation control section configured to execute, when the automated driving is being executed by the driving control section and the automated driving is able to be continued, preparation control which is a control that stops at least a part of the automated driving and makes a driver perform a preparation for switching to driving by the driver of the vehicle;
   a preparation determining section configured to determine whether or not to execute the preparation control; and
   a proficiency acquisition section configured to acquire a proficiency, which is a degree of proficiency of the driver in performing the preparation for switching to driving by the driver, wherein
   the preparation determining section is configured to, before stopping of at least part of the automated driving under the preparation control is started, refer to the proficiency acquired by the proficiency acquisition section, and determine whether or not to execute the preparation control based on at least the proficiency referred, and
   the preparation control section is configured to execute the preparation control when the preparation determining section determines that the preparation control should be executed,
   wherein
   in response to the proficiency being within a first range and the driver is not performing a secondary task, the preparation determining section executes the preparation control, in response to the proficiency being within a second range and the driver is performing a high-burden secondary task, the preparation determining section executes the preparation control, and in response to the proficiency not being within the first range or the second range and the driver is performing a low-burden secondary task, the preparation determining section executes the preparation control, wherein the first range is lower than the second range, a secondary task is an action performed by the driver other than a driving operation, the low-burden secondary task comprises tasks performable by the driver during driving by the driver, and the high-burden secondary task comprises tasks performable by the driver only during automated driving.

2. The information processing apparatus according to claim 1, further comprising a situation determining section configured to determine whether or not the vehicle is in a situation suitable for executing the preparation control, wherein the preparation determining section is configured to determine that the preparation control should be executed on at least one condition that the situation determining section has determined that the vehicle is in a situation suitable for executing the preparation control.

3. The information processing apparatus according to claim 2, further comprising an action detection section configured to detect a predetermined action performed by the driver of the vehicle other than driving of the vehicle, wherein the preparation determining section is configured to determine that the preparation control should be executed on at least one condition that the action detection section has detected that the driver is performing the predetermined action.

4. The information processing apparatus according to claim 2, wherein conditions of surrounding environment information for the preparation determining section to determine that the vehicle is in a situation suitable for executing the preparation control vary depending on the proficiency.

5. The information processing apparatus according to claim 1, further comprising a display control section configured to cause a display device configured to display an image to display the proficiency.

6. The information processing apparatus according to claim 1, further comprising a change section configured to change the proficiency in response to input operation made by a passenger of the vehicle.

7. The information processing apparatus according to claim 1, further comprising an execution notification section configured to cause a notification device, which is configured to be able to notify a passenger of the vehicle of information, to execute at least notification of at least one of a start notification which is a notification of starting the preparation control and an execution notification for notifying that the preparation control is being executed.

8. The information processing apparatus according to claim 1, wherein the proficiency is compared to a threshold for determining whether to execute the preparation control.

9. The information processing apparatus according to claim 1, wherein execution of the preparation control is suppressed by raising the proficiency.

10. The information processing apparatus according to claim 1, wherein the proficiency is increased or decreased based on an authority transfer time, the authority transfer time comprising an amount of time elapsed from a notification of a start of the preparation control to a determination that the driver is capable of performing the preparation switching to driving by the driver.

11. The information processing apparatus according to claim 1, wherein the preparation control section increases a frequency of the preparation control as the proficiency of the driver in performing the preparation switching to driving by the driver decreases.

* * * * *